United States Patent [19]

Prior

[11] 4,300,254
[45] Nov. 17, 1981

[54] RELEASE MECHANISM FOR UNDERWATER DEVICE, SUCH AS SEISMOGRAPH

[75] Inventor: Maurice J. Prior, Duncanville, Tex.

[73] Assignee: Mobil Oil Corporation, New York, N.Y.

[21] Appl. No.: 144,092

[22] Filed: Apr. 28, 1980

[51] Int. Cl.[3] ............................................ B63B 21/52
[52] U.S. Cl. ...................................... 9/8 R; 114/331
[58] Field of Search ............... 114/317, 124, 331, 326; 9/8 R, 33, 9, 46

[56] References Cited

U.S. PATENT DOCUMENTS

| | | | |
|---|---|---|---|
| 1,180,366 | 4/1916 | Asbury | 114/331 X |
| 2,464,834 | 3/1949 | Taylor | 9/8 R |
| 3,063,395 | 11/1962 | Brown | 114/331 |
| 4,136,415 | 1/1979 | Blockburger | 9/8 R |
| 4,138,658 | 2/1979 | Avedik et al. | 340/7 R |

FOREIGN PATENT DOCUMENTS 1550518  8/1979  United Kingdom .

OTHER PUBLICATIONS

Mattaboni et al., *Mitobs; A Seismometer System for Ocean-Bottom Earthquake Studies,* MIT, Marine Geophysical Researches 6/1976.
Whitmarsh, *A Buoyant Seismic Recording Apparatus for Use on the Ocean Bed,* I.E.R.E. Conference Proceedings, vol. 8, Paper No. 28, 1968.
Prothero, *An Operationally Optimized Ocean Bottom Seismometer Capsule,* NOAA, Dept. of Commerce, 1977.
Avedik et al., *Ocean Bottom Refraction Seismograph (OBRS),* Marine Geophysical Researches, 3, 1978, pp. 361-363.
Thobe, *Low Cost Earthquake Detection with Ocean Bottom Seismograph,* pp. 84-85.
Johnson et al., *A Free-Fall Direct-Recording Ocean Bottom Seismograph,* Marine Geophysical Researches, 3, pp. 103-117, 1977.
Johnson et al., *A Direct Recording Ocean Bottom Seismometer,* Marine Geophysical Researches, 3, pp. 65-85, 1977.
Lister et al., *An Ocean-Bottom Seismometer Suitable for Arrays,* Deep-Sea Researches, vol. 23, pp. 113-124, 1976.
Prothero, *A Free Fall Seismic Capsule for Seismicity and Refraction Work,* Offshore Technology Conference, Dallas, Texas, 1976.
Latham et al., *The Texas Ocean-Bottom Seismograph,* Draft given to Mobil 2/1978.
Arnett et al., *Ocean-Bottom Seismograph,* Proceedings IEEE, vol. 53, pp. 1899-1905, 1965.
Francis et al., *Ocean Bottom Seismograph,* Marine Geophysical Researches, 2, pp. 195-213, 1975.
Hueter et al., Marine Sciences Instrumentation, *Acoustical Noise Measuring Buoy with Digital Data Recording,* vol. 1, pp. 21-24, 1962.
Ibrahim et al., *A Comparison Between Sand Buoy and on Bottom Seismograph Data and Crystal Structure of the Texas Shelf Coast,* Soc. of Exploration Geophysicists, 1976.
Latham et al., *The Texas Ocean-Bottom Seismograph,* Offshore Tech. Conf., Houston, Texas, 1978.
Whitmarsh, *An Ocean Bottom Pop-Up Seismic Recorder,* Marine Geophysical Researches, 1, pp. 91-98, 1970.

*Primary Examiner*—Trygve M. Blix
*Assistant Examiner*—Stephen P. Avila
*Attorney, Agent, or Firm*—Charles A. Huggett; Michael G. Gilman; George W. Hager

[57] ABSTRACT

A release mechanism for use with an underwater exploration device such as one used to release ballast from an ocean bottom seismograph which includes primary and secondary release actuating devices. Ballast weights are secured to the seismograph by cables which themselves are secured by levers held immobile by a removable pin. The pin can be removed by the primary release actuating device, a rotary solenoid with linkage arms which produces a linear stroke, or by the secondary release actuating device, a coil spring held in compression by means of an electroplatable wire around and under the head of the pin, or both, allowing the levers to pivot releasing the cables and ballast weight. The mechanical advantage of the levers is utilized to allow a relatively heavy ballast weight to be held while requiring a much smaller force to remove the pin allowing its release.

4 Claims, 4 Drawing Figures

RELEASE MECHANISM FOR UNDERWATER DEVICE, SUCH AS SEISMOGRAPH

BACKGROUND OF THE INVENTION

This invention relates to a release mechanism which operates underwater and, more particularly, a mechanism which allows the release of ballast from a submersible geophysical exploration unit such as an ocean-bottom seismograph (OBS) permitting the recovery of the device and in the case of the OBS, the recorded data. In recent years, ocean bottom seismographs (devices for measuring vibrations in the earth's crust) have been increasingly utilized in underwater geophysical exploration. In a typical exploratory operation, one or more seismographs are located on the ocean floor to measure artificially generated seismic disturbances. Information gathered by the seismograph is either transmitted directly to the water's surface through appropriate leads for recording or is recorded within the seismograph on appropriate equipment and retrieved from the ocean floor. Positioning and recovery of these devices can be accomplished in shallow waters by divers but this method becomes an expensive if not impossible task in many of the deeper ocean areas where such exploration is now taking place. Cables have been used for positioning and recovery of OBS's and in some cases for the transmission of seismic data to the water's surface, but also have limitations which become more significant as OBS's are placed and operated at increasing depths. Cables are expensive, create turbulence in water flowing around the OBS causing noise which degrades the data being gathered, and may break or be severed resulting in loss of the equipment, data or both. For these reasons, so-called "pop-up" OBS's are increasingly being used in deep water seismic exploration. Pop-up seismographs generally comprise a frame fitted with floats, instruments, power sources and ballast. Released at the ocean's surface, they are allowed to free fall to the ocean floor. Recovery is accomplished by the planned release of ballast which allows the then buoyant assembly to float to the water's surface where it may be retrieved.

In recent years, a variety of ocean bottom seismographs have been constructed and used, each with its own release mechanism. In an article "Ocean Bottom Refraction Seismograph (OBRS)" published in *Marine Geophysical Researches* 3 (1978), F. Avedik, et al schematized an OBS release mechanism wherein the primary release actuator was a rotary motor operated cam which first released and then forced open a pivoting latching arm freeing the ballast and the secondary actuator was an explosive bolt which when detonated released the assembly by which the pivoting latching arm was secured. An electroplating stainless steel wire release mechanism was described by A. K. Ibrahim, et al at the 46th Annual Society of Exploration Geophysicists meeting of October 24, 1976 in Houston, Tex. The OBS in which that release mechanism was employed was relatively small (weighing approximately 170 pounds) and consisted of a single buoyant glass sphere mounted to a frame by three elastic straps joined together by a piece of stainless steel wire. Release was achieved by passing an electric current through the stainless steel wire causing it to electroplate into solution where exposed to the sea water eventually releasing the glass sphere.

Many of the release mechanisms employed thus far have used explosive bolts as a means of releasing the ballast. Although relatively safe, explosive bolts do, nonetheless represent a danger to personnel working with the OBS prior to its launch as well as during and after its recovery if an unexploded bolt is still present. Redundant means of releasing the buoyant package have been utilized on various OBS's.

OBJECTS OF THE INVENTION

A primary object of the invention is to provide an improved release mechanism for submersible geophysical exploration units.

Another object of the invention is to avoid the use of explosives in a release mechanism for submersible geophysical exploration units.

Another object of the invention is to provide a simple release mechanism for submersible geophysical exploration units which can be easily assembled for operation by a single person with ordinary tools.

Another object of the invention is to utilize the mechanical advantages of levers to release a relatively heavy ballast weight by applying a much smaller force to a pin.

Another object of the invention is to provide a redundant means for release in a submersible geophysical exploration unit in the event of failure of a primary release actuator.

SUMMARY OF THE INVENTION

Cables securing ballast to the bottom of an underwater exploration unit such as an ocean bottom seismograph are held by the ends of levers which themselves are pivoted just within the point where the cable is held. The resulting mechanical advantage is used in immobilizing each lever by passing a pin through the end of its remaining longer arm, perpendicular to the lever's plane of rotation. The pin, subjected primarily to frictional forces, may be removed by a tensile force many times smaller than the ballast load being secured. In one embodiment, a rotary solenoid is connected by linkage arms to an end of the pin. When the solenoid is activated, it removes the pin allowing the levers to pivot releasing the cables and ballast. Also provided is a coil spring which surrounds the pin and is held in compression by means of a cover piece such as a cylindrical housing with one partially closed end fitting over the spring and adapted to fit under the head of the protruding end of the pin. A dog-ended shaft is held in tension against the cover piece by an electroplatable wire. In the event of failure of the rotary solenoid, the pin may also be removed by electroplating the wire until it fractures releasing the dog-ended shaft allowing the spring to expand removing the pin. In a second embodiment, the rotary solenoid and linkage arms are not provided and release is accomplished by electroplating the wire. Neither embodiment involves the use of explosives. Further, both embodiments are devices which can be easily assembled for operation by a single person with ordinary tools.

BRIEF DESCRIPTION OF THE DRAWINGS

The features of the present invention will be more clearly understood upon reading the following description of the two embodiments, the first of which is illustrated in the attached drawings, in which.

DESCRIPTION OF THE PREFERRED EMBODIMENTS

Figure 1:
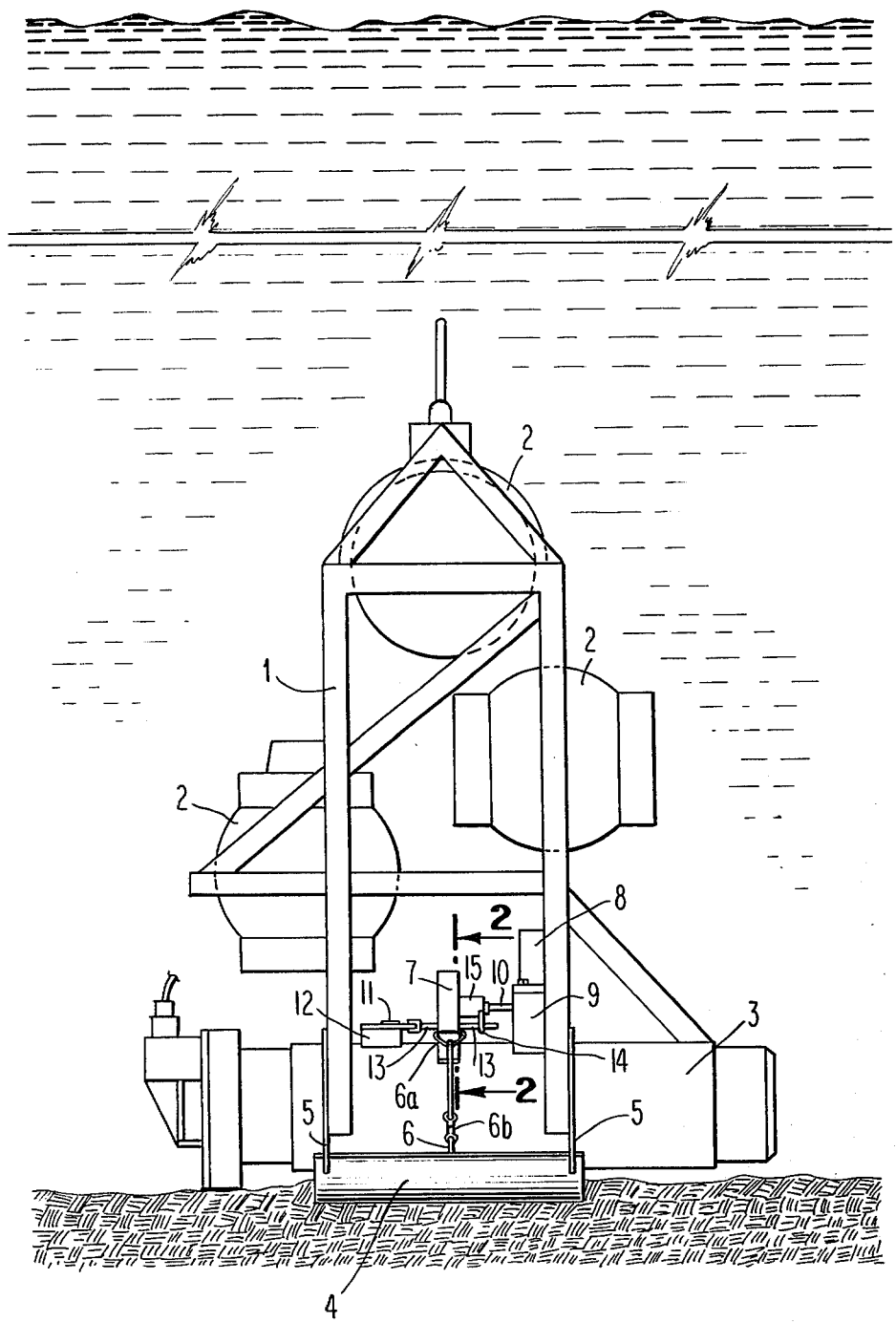
FIG. 1 is a diagrammatic view of an OBS mounting the invention.

The major components of the OBS depicted in FIG. 1 include a frame 1, floats 2, a sealed instrument housing 3, and a ballast weight 4. An identical ballast weight (not shown) is symmetrically located on the "rear" side of the OBS as viewed in FIG. 1. The floats 2 are provided primarily for buoyancy, but may also be used to carry instrumentation, power supplies or both, although positive buoyancy of the OBS (without ballast) must, of course, be maintained to allow recovery. A cable 6 from the ballast weight 4 to a release lever housing 7 is maintained under spring tension prior to ballast release and holds the ballast weight 4 against plates 5 which are mounted to the frame and are contoured to mate with the ballast weight 4. Weighted metal tubes have been used as ballast weights 4 in tests of the invention. The tubes also function as "feet" providing a surface area which helps to prevent the OBS from settling too deeply into a muddy bottom and stabilizes the OBS while in operation. Obviously other ballast configurations can be used to achieve the same results without affecting the operation of the disclosed invention. A loop 6a or similar means is provided to enable the end of each cable 6 to be secured in the release lever housing 7. A similar cable 6 and loop 6a from the ballast weight 4 on the "rear" side of the OBS (as viewed in FIG. 1) is secured symmetrically on the "rear" side of the release lever housing 7. It is preferred that each cable 6 be tensilely loaded to assure release of the ballast weights 4. For this purpose a turnbuckle 6b or other suitable means (not shown) or both can be provided. In tests of the invention a tensile load of approximately 400 pounds has been applied to each cable 6 by a compression spring (not shown) in each ballast weight 4. The 400 pound figure is not controlling; it is only necessary that sufficient tensile force be imparted to the cables to assure pivoting of the levers 16 in the release lever housing 7 (see FIG. 2). Other components of the release system depicted in FIG. 1 and depicted in more detail in FIGS. 2-4, include a rotary solenoid 8, a base 9 for mounting the rotary solenoid 8, a linkage arm 10, a plating wire assembly 11, a base 12 for mounting the plating wire assembly 11, a shaft 13, a dog 14 movably mounted on one end of the shaft 13 and a cylindrical housing 15.

Figure 2:
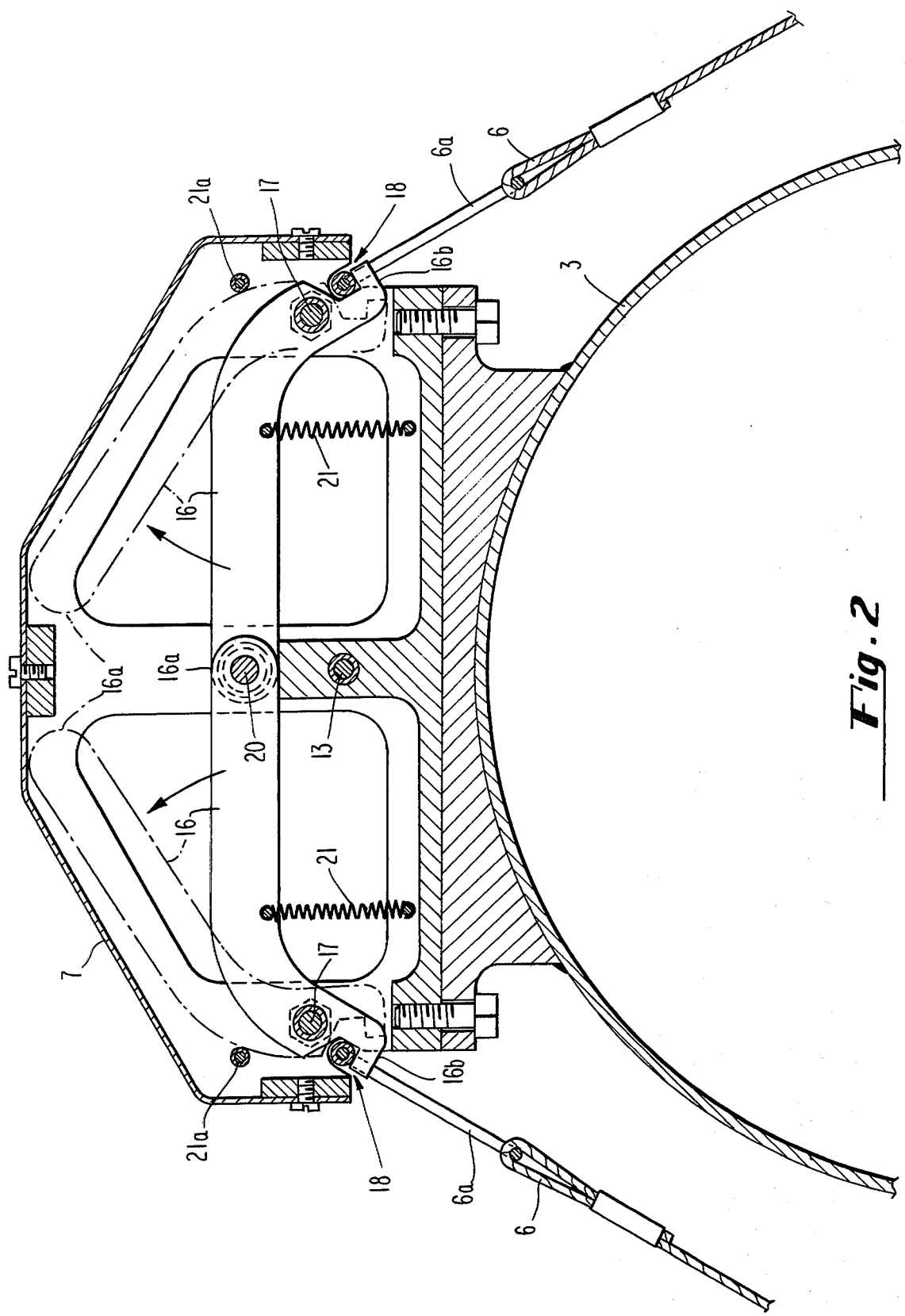
FIG. 2 is a cross-sectional view taken along line 2—2 of FIG. 1.

FIG. 2 provides a detailed cross-sectional view of the release mechanism components associated with the release lever housing 7. In both embodiments, the release lever housing 7 is mounted by suitable means, e.g., welding or bolting to a base welded to the instrument housing 3, although the frame 1 may be modified to carry the release lever housing 7. Two levers 16 are pivotably mounted one at either lower outer end of the release lever housing 7 on axles 17. The levers 16 are shown in phantom as pivoted. Recesses 18 provided at either lower outer corner of the release lever housing 7 are contoured to accept a loop 6a. The outer arm 16b of each lever 16 is notched allowing its extreme outer end to be passed under and to hold a loop 6a while the OBS is in the "ballast loaded" configuration. The inner arms 16a of the levers 16 overlap and are adapted to accept a pin 20 which passes perpendicularly through the release lever housing 7 (see FIG. 4). The tensilely loaded cables 6 place a torsional load on the levers 16 which tends to force their inner arms 16a upwards. Thus, when the retaining pin 20 is removed, the levers 16 are pivoted to the position shown in phantom and each cable 6 and connected ballast weight 4 is released allowing the OBS to float to the surface for recovery. The axles 17 are located near the extreme outer ends of the levers 16, just inside the notched area of those levers so as to utilize the resulting mechanical advantage to minimize the shear loads placed on the pin 20. In both embodiments, retaining springs 21 are provided for convenience to position the arms 16 initially for pin loading and to return the arms 16 to that position after pin release. "Bumper" pins 21a are also provided to prevent the inner arms 16a of the levers 16 from striking the inner upper surface of the release lever housing 7 when the pin 20 is removed. Front and rear covers (not shown in FIG. 2) are preferably provided on the release lever housing 7 parallel to the plane of line 2—2 to prevent foreign material from entering and interferring with the motion of the levers 16.

Figure 3:
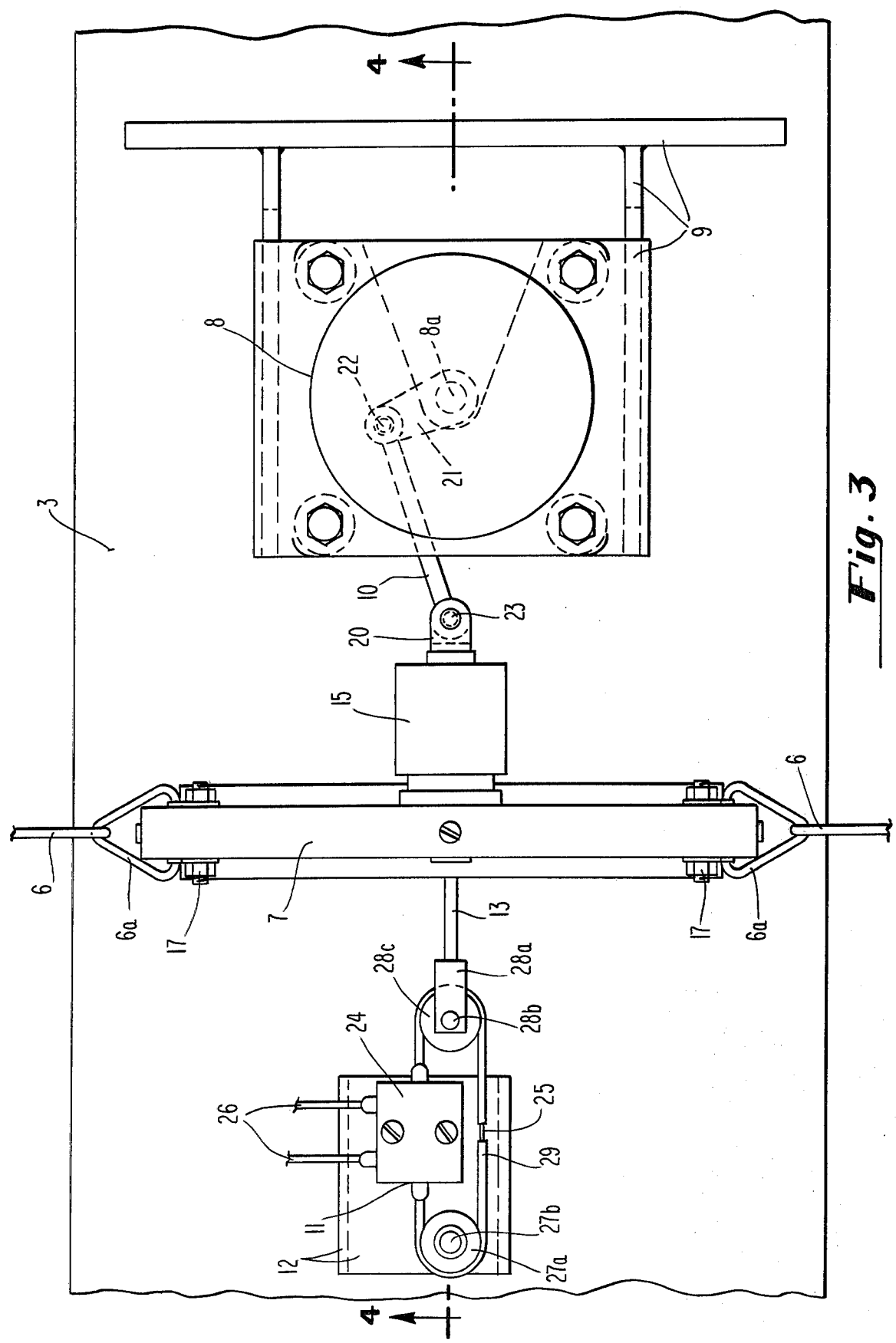
FIG. 3 is an overhead view of the release mechanism.

FIG. 3 shows the elements of the primary and some of the elements of the secondary means for removing the pin 20 of the first embodiment, while in the ballast loaded position. The primary release actuator, a rotary solenoid 8, is mounted on a base 9 affixed to the instrument housing 3. In the alternative, the rotary solenoid 8 or its base 9 may be affixed to the frame 1. The rotary solenoid 8 is provided with a protruding drive shaft 8a and is mounted on its base 9 with the drive shaft 8a extending towards the surface of the instrument cylinder 3 into the cavity formed by the base 9. Rotary solenoids with drive shafts suitable for underwater operation are well-known in the art and are commercially available. The linkage arm 10 is rotatably affixed at one of its ends by a first clevis 23 to the end of the pin 20 protruding from the cylindrical housing 15 and at its second end by a second clevis 22 to an end of a second linkage arm 21. The remaining end of the second linkage arm 21 is rigidly attached to the drive shaft 8a by appropriate means (not shown) such as welding or a lock pin. A power supply and control circuitry (neither shown) for operation of the rotary solenoid 8, may be carried in the instrument housing 3 or in one or more of the floats 2 (FIG. 1) or both. When power is supplied by appropriate leads (not shown) to the rotary solenoid 8, the drive shaft 8a is rotated in a clockwise fashion (as viewed in FIG. 3) which, through the action of linkage arms 10 and 21, causes the pin 20 to be pulled toward the shaft 8a freeing the levers 16 located in the release lever housing 7. The levers 16 then pivot on axles 17, releasing the cables 6 and ballast weights 4.

The plating wire assembly 11, depicted in FIG. 3 comprises a hard rubber junction box 24 and platable wire 25. A base 12 is provided for rigidly mounting the plating wire assembly 11 to the instrument housing 3 although the plating wire assembly 11 could also be mounted to a suitably constructed frame 1. In the embodiment tested, a commercially available plating wire assembly (Model 855 2T of the Benthos Company) with a platable titanium wire was used, although other types of wire such as stainless steel or magnesium would be suitable. (The Benthos wire was found to electroplate to failure in sea water in two minutes when a one amp current was supplied and a tensile load of sixty pounds was applied.) The purpose of the platable wire 25 is to hold the dog 14 at the end of the shaft 13 against the face of the cylindrical housing 15 until release of the ballast weights 4 is desired. In both embodiments, when release of the ballast weights 4 by means of the plating wire assembly 11 is desired, a suitable electric current from a power supply (not shown) is introduced through leads 26 to the junction box 24 and the wire 25 which electroplates into solution by galvanic reaction until breaking. In FIG. 3, the platable wire 25 is shown covered by a protective material 29; however, a gap is provided to allow a portion of the platable wire 25 to be directly exposed to the salt water. The protective material 29 is not required for proper operation of the invention.

The platable wire 25 is used to apply a releasable tensile load on the end of shaft 13. To accomplish this, one end of the platable wire 25 is secured by passing it around a circular grommet 27a which is attached to the base 12 by appropriate means such as a bolt 27b. The end of shaft 13 opposite that carrying the dog 14 is secured to the wire 25 by means of a yoke 28a attached to that end of the shaft 13 by suitable means. The yoke 28a, by means of a second bolt 28b, holds a second grommet 28c around which the wire 25 is looped.

Figure 4:
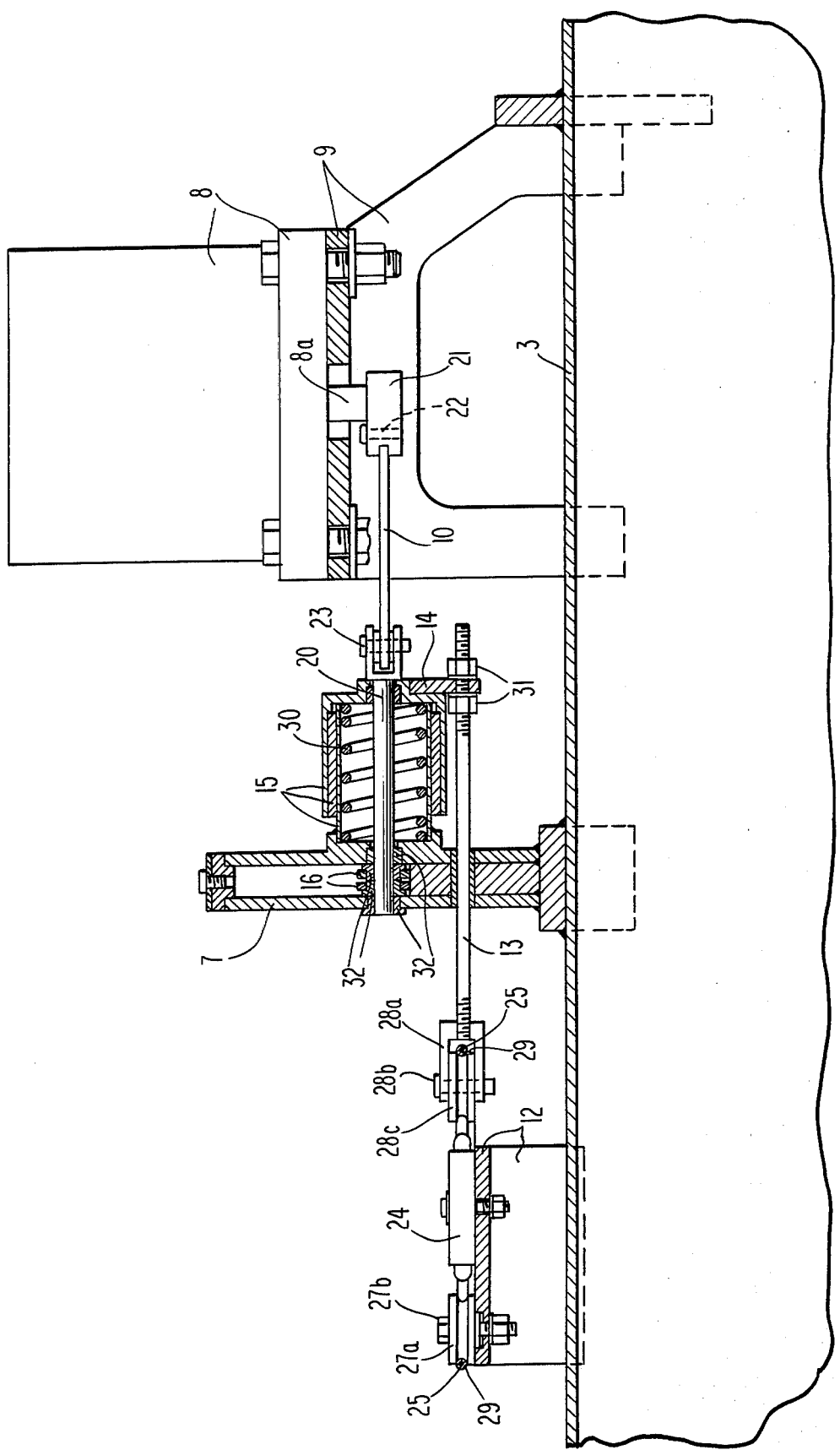
FIG. 4 is a longitudinal section of the release mechanism of FIG. 3 taken along line 4—4 of that figure.

FIG. 4 shows the remaining components of the release mechanism associated with the plating wire assembly 11, again in the ballast loaded configuration. A coil spring 30 is positioned around and axially parallel to the pin 20. In both embodiments, the pin 20 has its greatest cross-sectional diameter at the end protruding from the cylindrical housing 15. Prior to ballast release, the coil spring 30 is compressed against the side wall of release lever housing 7 by the cylindrical housing 15 which has a partially enclosed end that covers an end of the coil spring 30. The hole in the partially enclosed end of cylindrical housing 15 is smaller in diameter than the cross-sectional diameter of the end of the pin 20 protruding from the cylindrical housing 15. For convenience, the length of cylindrical housing 15 can be such that when its open end is in contact with the side wall of the release lever housing 7, the coil spring 30 is suitably compressed. The coil spring 30 is held in a compressed state by means of the dog 14, which abuts the outer surface of the partially closed end of the cylindrical housing 15. The dog 14 is mounted for adjustment on the shaft 13 and may be secured at any desired location along the end of shaft 13 by appropriate means such as nuts 31 along a threaded portion of the shaft 13. Thus, when release of the ballast weights 4 via the platable wire assembly 11 is desired, an electric current is supplied through the leads 26 from a power source (not shown) to the platable wire 25. The platable wire 25 electroplates into solution until it is sufficiently weakened to break under the tension applied by coil spring 30. When the platable wire 25 breaks, the shaft 13 is freed allowing the compressed coil spring 30 to expand forcing the cylindrical housing 15 and pin 20 toward the right (as viewed in FIG. 4) freeing the levers 16 to pivot releasing the cables 6 and ballast weights 4.

In both embodiments, bushings 32 having wearing faces made of a low friction material, such as those commercially available bushing faced with the acetal resin sold under the tradename "DELRIN," are preferably provided in the side walls of the release lever housing 7 and in the inner arms 16a of the levers 16 where the pin 20 passes. The function of the bushings 32 is to protect the inner arms 16a and the walls of the release lever housing 7 and to maintain the alignment of and to reduce the frictional loading on the pin 20 which would retard its removal by either the rotary solenoid 8 or the coil spring 30. It has been found that a tensile force of less than two pounds is all that is needed to remove the pin 20 when suitable bushings 32 and suitably sized and positioned levers 16 were used in tests of the depicted embodiment of the invention.

The second embodiment consists of the previously described embodiment absent the rotary solenoid 8 and drive shaft 8a, the base 9, the linkage arms 21 and 10 and the clevises 22 and 23. Operation of the remaining components is exactly as described above.

Where the first embodiment is used, it is preferred that suitable control circuitry be provided to attempt release of the ballast weight 4 initially by use of the rotary solenoid 8 as use of the plating wire assembly 11 results in the destruction of the platable wire 25 necessitating its replacement if the release mechanism is to be reused. Suitable control circuitry can also be provided to both actuate the rotary solenoid 8 and electroplate the wire 25 at the same time under emergency conditions. Circuits to control the supply of electrical power to the rotary solenoid 8 and/or platable wire assembly 11 are the subject of a companion application, Mobil Ser. No. 163,592.

Although the principles of the present invention have been described above in relation to two embodiments, it must be understood that the said descriptions are only made by way of example and do not limit the scope of the invention.

What is claimed is:

1. In a submersible geophysical exploration unit which is recovered at the water's surface, a mechanism for releasing ballast weight from said unit when submerged comprising:
    a pin;
    means for attaching said ballast weight to said unit by said pin;
    a rotary solenoid having a protruding drive shaft;
    a first linkage arm having one end rigidly attached to said protruding drive shaft; and
    a second linkage arm rotatably attached at one end to said first linkage arm and at the other end to said pin, whereby said pin is removed by said drive shaft upon activation of said rotary solenoid to release said ballast weight.

2. The release mechanism in claim 1 wherein said means for attaching said ballast weight to said unit by said pin includes a plurality of levers having a mechanical advantage which allows the release of said ballast weight with a small force on said pin.

3. The release mechanism recited in claim 2 further including:
    a frame mounted on said unit,
    each of said plurality of levers pivotally attached to said frame and each having a first end adapted for receiving said pin;
    a plurality of cables, each having a first end attached to said ballast weight; and
    means for securing the second end of each cable by the second end of said levers so that said cables and ballast weight are released by said levers when said pin is removed.

4. The release mechanism recited in claim 2 further including:
    a frame mounted on said unit adapted to pivotally attaching to said plurality of levers;

a plurality of cables each having a first end attached to said ballast weight;
means for securing the second end of each of said cables by an adapted lever arm end; and
said plurality of levers being each pivotally attached to said frame at a pivot point from which extends a first, longer lever arm adapted to receiving said pin and a second, shorter lever arm adapted for securing said means for securing the second end of each of said cables.

* * * * *